United States Patent [19]

Dessouroux

[11] Patent Number: 4,692,078
[45] Date of Patent: Sep. 8, 1987

[54] NUT DEVICE HAVING AUTOMATIC POSITIVE LOCKING

[75] Inventor: Alexis A. J. Dessouroux, Belgique, Belgium

[73] Assignee: Shur-lok International S.A., Belgique, Belgium

[21] Appl. No.: 870,302

[22] Filed: May 23, 1986

Related U.S. Application Data

[63] Continuation of Ser. No. 526,810, Aug. 26, 1983, abandoned.

[30] Foreign Application Priority Data

Aug. 30, 1982 [FR] France .................................. 82 14808

[51] Int. Cl.$^4$ ............................................. F16B 39/12
[52] U.S. Cl. .................................. 411/231; 411/237; 411/290; 411/433
[58] Field of Search ............... 411/231, 222, 223, 432, 411/433, 290, 291, 237, 402

[56] References Cited

U.S. PATENT DOCUMENTS

| 643,615 | 2/1900 | Nickerson | 411/223 |
|---|---|---|---|
| 1,183,556 | 5/1916 | Green | 411/222 |
| 2,384,953 | 9/1945 | Miller | 411/237 |
| 2,587,560 | 2/1952 | Widmer | 411/231 |
| 3,494,399 | 2/1970 | Heighberger | 411/237 |

FOREIGN PATENT DOCUMENTS

| 523403 | 7/1940 | United Kingdom | 411/223 |
|---|---|---|---|
| 524157 | 7/1940 | United Kingdom | 411/222 |
| 527340 | 10/1940 | United Kingdom | 411/427 |

Primary Examiner—Gary L. Smith
Assistant Examiner—Adrian H. Whitcomb, Jr.
Attorney, Agent, or Firm—Burns, Doane, Swecker & Mathis

[57] ABSTRACT

The device has a screwthreaded collar 9 constituting a brake and trapped in a cavity 5 of a nut 2 with respect to which it is connected to rotate and axially movable in the cavity between an internally first position in which its screwthread 12 is in phase with the screwthread 3 of the nut and a second position in which the screwthreads are no longer in phase. The collar has splines 13 in its screwthread adapted to cooperate with splines in the screwthread 34 of a shaft 18 on which the nut is screwed so as to be immobilized in rotation on this shaft when the screwthreads of the collar 9 and the nut 2 are no longer in phase. For mounting the nut device, a tool is provided which comprises a hollow sleeve 20 defining a cavity adapted to receive the nut 2, an arrangement 29 for retaining the nut in a resilient manner and an arrangement 32 for maintaining the collar 9 in the first position at the inner end of the cavity 5 in opposition to the action of the second ring 15 when the nut is retained in the sleeve.

8 Claims, 6 Drawing Figures

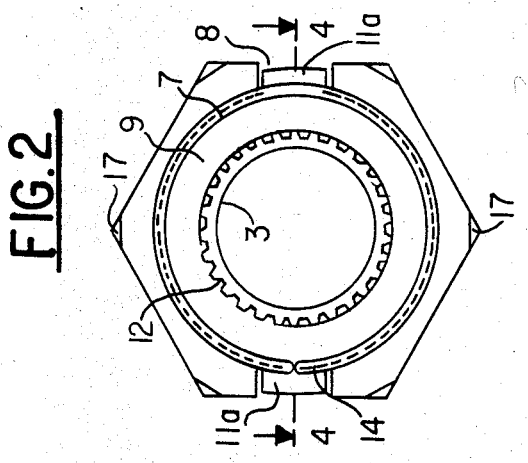
FIG.1
FIG.2
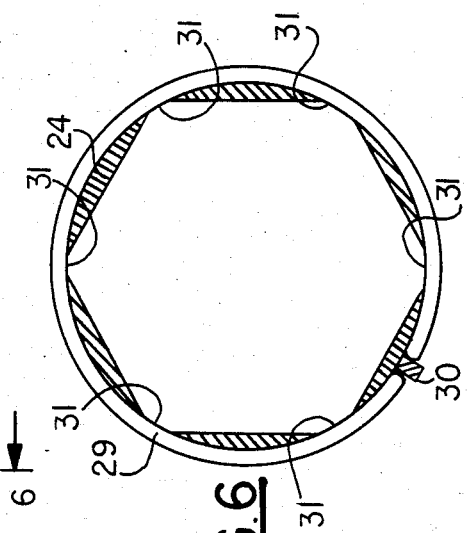
FIG.6
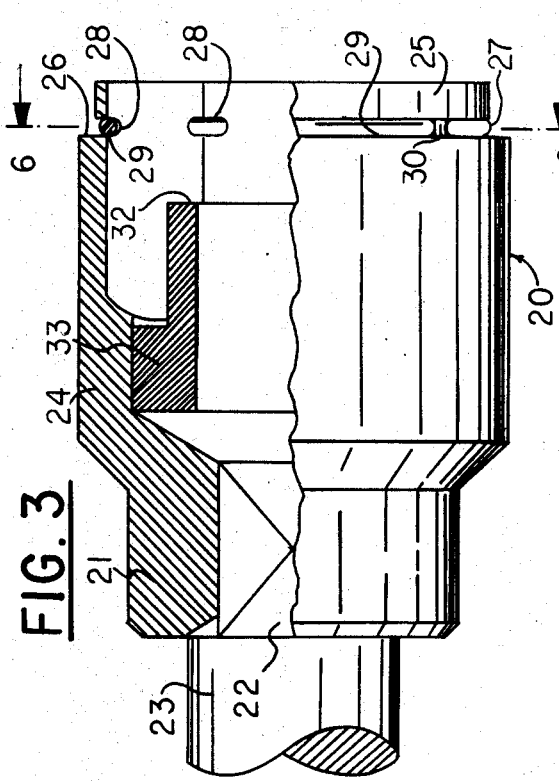
FIG.3

NUT DEVICE HAVING AUTOMATIC POSITIVE LOCKING

This application is a continuation of application Ser. No. 526,810, filed Aug. 26, 1983 and now abandoned.

The present invention relates to a nut device having an automatic positive locking.

Many types of nut devices having a positive locking are known the most conventional example of which is the slotted nut associated with a pin disposed in an aperture in the shaft on which the nut is screwed and extending through this aperture and through two slots of the nut.

It is well known that the devices of this type have many drawbacks, one of the most important of which is the fact that the tightening of the nut is determined by the favourable position in which two diametrically opposed slots of the nut assume with an aperture in the shaft on which the nut is screwed.

Further, this device is only utilizable with shafts of a certain diameter below which the presence of the aperture would seriously reduce the strength.

An object of the invention is to overcome this drawback and to provide for this purpose a nut device having an automatic positive locking, which comprises a screwthreaded collar which constitutes a brake and is trapped in a cavity of a nut with which it is connected in rotation and is axially movable in said cavity between a first position in which its screwthread is in phase with the screwthread of the nut and a second position in which its screwthread is no longer in phase with the screwthread of the nut, and comprises means adapted to cooperate with complementary means of the shaft on which the nut is screwed so as to be immobilized as concerns rotation on said shaft when its screwthread is no longer in phase with the screwthread of the nut.

According to another feature of the invention, said screwthreaded collar constituting a brake is elastically biased in the cavity of the nut toward said second position.

Another object of the invention is to provide a tool for mounting a nut device having an automatic positive locking such as defined hereinbefore, said tool comprising a sleeve adapted to receive said nut and comprising means for elastically retaining the nut in a detachable manner with said screwthreaded collar constituting a brake maintained in said first position in the cavity of the nut.

Further features and advantages of the invention will be apparent from the ensuing description with reference to the accompanying drawing which is given solely by way of example and in which:

FIG. 1 is an side elevational view, with a part cut away of a nut device having an automatic positive locking according to the invention;

FIG. 2 is a rear elevational view thereof;

FIG. 3 is a side elevational view, with a part cut away, of a tool according to the invention for mounting a nut device having an automatic positive locking according to the invention;

FIG. 6 is a sectional view taken along line 6—6 of FIG. 3.

Figure 4:
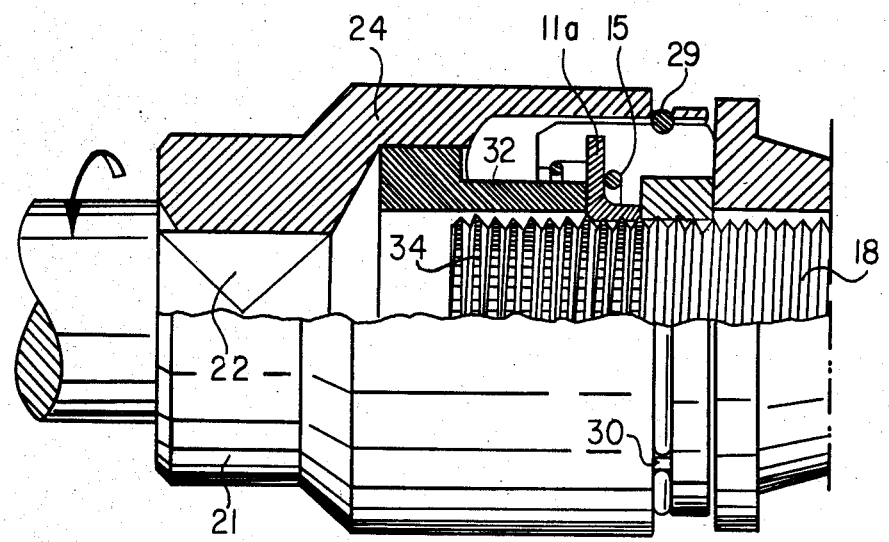
FIG. 4 is a side elevational view, with a part cut away, showing the mounting of a device according to the invention.

The nut device having an automatic positive locking according to the invention, which is generally designated by the reference numeral 1, is shown in FIG. 1 with a part of the nut cut away. It comprises a nut proper having a massive body 2 defining a central bore including an internal screwthread 3 from which rearwardly extends a skirt 4 defining a cavity 5 having a divergent frustoconical inner wall 6 which terminates in a small radial flange 7 which extends inwardly and defines a shoulder with the wall 6.

The nut further comprises in its outer surface two milled recesses which extend axially and define diametrically opposed grooves 8 for a purpose which will be clear hereinafter. These grooves are extended throughout the thickness of the skirt 4 from the point at which the skirt is connected to the body 2.

Disposed inside the cavity 5 is a collar 9 constituting a brake which has a cylindrical body 10 including an outwardly extending radial flange 11 having a diameter which is at the most equal to the diameter of the opening which is defined at the rear of the nut by said flange 7.

Figure 5:
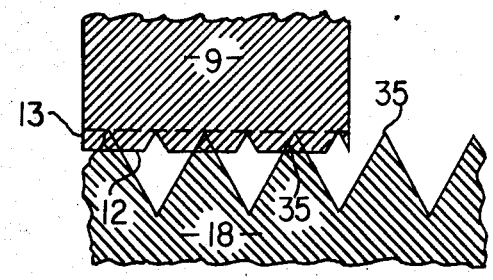
FIG. 5 is a partial view, to a considerably enlarged scale, of the screwthreaded collar constituting a brake which is immobilized in rotation on a shaft on which the nut is screwed.

The collar 9 has an internal screwthread 12 having the same dimensions as the screwthread 3 of the nut 2 except that its threads have truncated crests, as shown to an enlarged scale in FIG. 5.

The internal screwthread 12 also includes axially extending keying means in the form of splines (better seen in FIG. 5) 13.

The collar 9 is retained inside the cavity 5 by means of a split resilient ring 14 whose section is slightly greater than the height of the shoulder defined by the flange 7 with the frustoconical wall 6, this ring preventing the collar 9 from leaving the cavity 5.

Between the flange 11 of the collar 9 and the inner end of the cavity 5 there is disposed a second split resilient ring 15 having a section distinctly greater than the section of the ring 14 so as to form a spring. The slot of this ring is sufficient to enable it to be introduced under stress into the cavity 5 before the collar 9 is placed in position.

It will be understood that owing to the resiliency of the ring 15, when it is introduced under stress, it tends to open and slides along the frustoconical surface 6 and urges the collar 9 in the direction of the opening defined by the flange 7 to an outermost position against this flange 7, without the collar 9 being able to escape so that it is consequently maintained against the flange 7 by the ring 15.

The nut includes recesses 16 formed in each of the corners between its flat faces, these recesses being preferably located in the region of the massive body 2. The end of each of these edges at the rear end of the nut is chamfered as shown at 17 for a purpose which will be clear hereinafter.

It will be understood from FIG. 1 that the collar 9 can move inside the cavity 5 and that the length of its part 10 and the diameter of its flange 11 allow it to assume an innermost position and to bear against the inner end of the cavity when sufficient pressure is exerted on the collar to overcome the resilient resistance opposed by the ring 15. When the collar 9 is thus in this innermost position, its screwthread is then in phase with the screwthread 3 of the nut and the device then behaves as a single-piece nut and can be screwed as a unit on a shaft 18 as shown in FIG. 4.

In order to be able to screw in this way the device 1 as a unitary nut on the shaft 18, there is provided according to the invention a tool which is illustrated in FIGS. 3 and 4 and is generally designated by the reference numeral 20.

This tool comprises a cylindrical hollow sleeve having a rear portion 21 in which there is formed an aperture 22 having a square section and adapted to receive the square head of a driving element 23.

The sleeve includes an enlarged opposed portion 24 defining internally a cavity which is complementary to the shape of the nut 2 of the device 1 and is, in the presently-described embodiment hexagonal. The wall of the portion 24 has an end portion 25 of reduced outside diameter defining with the portion 24 a shoulder 26 at the base of which is formed a groove 27 having such depth that it opens onto the interior of the cavity of the sleeve as shown at 28 (FIG. 3) in the region of the corners corresponding to those of the nut. Disposed in the groove 27 is a split resilient ring 29 having an appendix 30 which extends outwardly through an aperture formed in the bottom of the groove 27. This appendix 30 has for purpose to prevent the ring 29 from rotating in the groove.

It will be understood that owing to the apertures 28, the ring 29 projects slightly inside the portion 24 of the sleeve in the region of each of the dihedral angles formed by the hexagonal cavity of the sleeve, as shown at 31 in FIG. 6.

Formed in the bottom of the cavity of the portion 24 of the sleeve is a portion of reduced diameter in which there is inserted with a drive fit a cylindrical annular member 32 having a portion 33 which is thicker and is fitted in the bottom of the cavity, the cylindrical portion 32 extending coaxially with the portion 24 and having an inside diameter larger than that of the screwthread 3 of the nut.

It will be understood from FIGS. 1 and 3, that, when the tool 20 is placed on the rear end of the nut 2, the chamfered ends 17 of the corners of the nut are then in confronting relation to the inwardly projecting portions 31 of the ring 29 and these ends 17 constitute inclined camming surfaces which resiliently expand the ring 29.

With reference to FIG. 4, the sleeve has been completely mounted on the nut until the moment when the ring 29 has suddenly and resiliently clipped into the recesses 16 of the device 1 and thereby retains the latter in the tool 20.

It will also be understood that, by placing the sleeve on the nut, the cylindrical portion 32 bears against the rear surface of the collar 9 and urges the latter into the bottom of the cavity 5 of the nut, in opposition to the resilient resistance exerted by the ring 15, and thus brings the screwthread 12 of the collar 9 in phase with the screwthread 3 of the nut.

The device may then be screwed as a unitary nut on the shaft 18.

When the desired tightening torque has been applied to the device 1, the sleeve is shifted rearwardly so that the inclined sides of the recesses 16, which act as an inclined camming surface, resiliently expand or spread apart the ring 29 so as to release the device.

The tool having been withdrawn, the resilient ring 15 tends to urge the flange 11 of the collar 9 rearwardly and outwardly of the nut.

The splines 13 of the collar 9, the screwthreads of which are truncated, then cooperate with corresponding splines 34 formed on the crests of the screwthreads of the shaft 18 in the end portion of the latter as shown in FIG. 4. As the spacing between the splines 34 and the splines 13 correspond and is relatively small, the resilient force exerted by the ring 15 is sufficient to cause the collar 9 to slide in such manner that its splines engage with the complementary corresponding splines of the shaft 18, subsequent to a very slight angular displacement of the device on the shaft 18 which affects in no way the tightening torque initially exerted on the nut for bringing the splines 13 into alignment with the splines 34.

The collar 9 which is, on one hand, connected to rotate with the skirt 4 of the device by its ears 11a engaged in the grooves 8 and, on the other hand, also connected to rotate with the shaft 18 by the cooperation of the splines 13 and 34, thus positively immobilizes the nut 2.

In the second or outermost position of the collar 9, or the locking position, at the rear end of the cavity 5 to which it has been urged by the action of the resilient rings, the screwthread 12 of the collar is no longer in phase with the screwthread 3 of the nut. However, this nut may, notwithstanding its positive locking, be extremely easily withdrawn without any wear of the whole of the device.

Indeed, it is sufficient to re-engage the tool 20 on the nut 2 until the resilient ring 29 is resiliently clipped into the recesses 16 of the nut and thus returns the collar 9 to its innermost position against the inner end of the cavity 5 with its screwthread 12 in phase with the screwthread of the nut 2 (as shown in FIG. 4) and consequently releases the crests 35 of the screwthreads of the shaft 18 from the splines 13 of the collar 9 which were, in the outermost or locking position of the collar, located axially between the threads of the screwthread 12 as shown in FIG. 5. The whole of the device can then immediately be unscrewed, this device remaining retained in the tool by the resilient action of the ring 29 and being capable of being subsequently put back in position, either in the same position, or at another point of the length of the shaft 18 in a new position in which the device may be positively locked just as easily provided of course that the splines are provided in the shaft screwthread in this new position.

It will be understood that the device and the tool according to the invention provide a positive and instantaneous locking of a nut to which a given torque has previously been applied with great precision.

This device may of course be disassembled and put back into position many times without any wear occurring.

What I claim as new and desire to secure by Letters Patent is:

1. A nut device having an automatic positive locking, comprising a nut having a longitudinal axis and an internal screwthread, a cavity in the nut, a collar constituting a brake disposed in the cavity and having an internal screwthread substantially similar to the screwthread of the nut, means for retaining the collar in the cavity, means for connecting the collar to the nut so as to cause the collar to rotate with the nut, the collar being axially movable in the cavity between an innermost position in the cavity in which its screwthread is in phase with the screwthread of the nut and an outermost position relative to the cavity in which said screwthreads are no longer in phase with each other, elastically yieldable means interposed between the collar and the nut for biasing the collar in a direction from said innermost position to said outermost position, the collar including axially extending internal keying means formed in the internal screwthread of the collar for cooperating with complementary axially extending external keying means formed in threads of a screwthreaded shaft on which the nut is adapted to be screwed, so that the collar is capable of being immobilized in rotation on said shaft when, in the course of screwing the device on the shaft, the collar is moved by the shaft away from said innermost position toward said outermost position in the cavity and has engaged said external keying means on the screwthread of the shaft and the screwthreads of the collar and the nut are no longer in phase with each other and the collar is freely axially slidable along the shaft, without rotating relative to the shaft and relative to the nut, to said outermost position under the action of said elastically yieldable means, said cavity having an outwardly divergent frustoconical shape and a diameter greater than the diameter of said collar and a radially inwardly extending first flange defining an opening having a diameter which is substantially equal to the diameter of the collar, said collar having a cylindrical body and a radially extending second flange having a diameter roughly equal to the diameter of said opening defined by the first flange, the device further comprising, for retaining the collar in the cavity, a resilient ring which is disposed between the first flange and the second flange and has a section in a plane perpendicular to said axis whose diameter is greater than the opening defined by the first flange, and said elastically yieldable means comprise a resilient split ring disposed at the rear of the collar between the second flange and an axially inner end of said frustoconical cavity and operative to resiliently bias the collar outwardly toward the first flange to said outermost position.

2. A device according to claim 1, wherein the screwthread of the collar is in phase with the screwthread of the nut when said collar is urged into contact with the the axially inner end of the cavity in opposition to the resilient action of the resilient second ring.

3. A structure comprising in combination: a screwthreaded shaft and a nut device having an automatic, definite and rigid locking, comprising a nut having a longitudinal axis and an internal screwthread engaging the screwthread of the shaft, a cavity in the nut, a collar which is part of definite locking means and is disposed in the cavity and has an internal screwthread substantially similar to the screwthread of the nut, means for axially retaining the collar in the cavity, means for connecting the collar to the nut so as to cause the collar to rotate with the nut, the collar being, when the nut device is not combined with the shaft, axially movable in the cavity between an innermost position in the cavity in which its screwthread is in phase with the screwthread of the nut and an outermost position relative to the cavity in which said screwthreads are no longer in phase with each other, elastically yieldable means interposed between the collar and the nut for biasing the collar in a direction from said innermost position to said outermost position, the collar including axially extending internal keying means formed in the internal screwthread of the collar cooperating with complementary axially extending external keying means formed in threads of the screwthreaded shaft on which the nut is screwed, so that the collar is rigidly immobilized in rotation on said shaft in said outermost position in the cavity and the screwthreads of the collar and the nut are no longer in phase with each other and the collar is axially slidable along the shaft in opposition to the action of the elastically yieldable means, without rotating relative to the shaft and relative to the nut, to said innermost position for the purpose of deliberately unlocking the nut device relative to the shaft when it is desired to deliberately unscrew the nut device from the shaft.

4. A structure according to claim 3, wherein said internal and external keying means comprise interengaged axially extending splines formed in the internal screwthread of the collar and the external screwthread in such manner that when the external splines of the shaft engage the internal splines of the collar throughout the axial extent of the collar, the collar is freely slidable along the shaft without rotating relative to the shaft.

5. A structure according to claim 3, wherein the means connecting the collar to the nut for rotating with the nut comprise two radially outwardly extending ears on the collar and two complementary grooves in the nut in which grooves the ears are engaged.

6. A structure according to claim 3, wherein the cavity has an outwardly divergent frustoconical shape and a diameter greater than the diameter of said collar, and a radially inwardly extending first flange defining an opening having a diameter which is roughly equal to the diameter of the collar.

7. A structure according to claim 6, wherein the collar has a cylindrical body and a radially extending second flange having a diameter roughly equal to the diameter of said opening defined by the first flange, the ears projecting from the second flange.

8. A structure according to claim 3, wherein the nut has flat lateral faces defining corners and a recess in each of the corners and the nut has a rear edge in the region of the first flange which is slightly chamfered at the ends of the corners of the nut.

* * * * *